(12) United States Patent
Barron et al.

(10) Patent No.: US 7,509,289 B2
(45) Date of Patent: Mar. 24, 2009

(54) SYSTEM AND METHOD FOR SINGLE EVENT AUTHORIZATION CONTROL OF TRANSACTIONS

(75) Inventors: Mitch Barron, Columbus, GA (US); Hank Crye, Pine Mountain Valley, GA (US); Keith Helms, Midland, GA (US); Johnny Ray Watson, Jr., Phenix City, AL (US)

(73) Assignee: Total System Services, Inc., Columbus, GA (US)

( * ) Notice: Subject to any disclaimer, the term of this patent is extended or adjusted under 35 U.S.C. 154(b) by 1358 days.

(21) Appl. No.: 10/278,625

(22) Filed: Oct. 23, 2002

(65) Prior Publication Data

US 2004/0210531 A1    Oct. 21, 2004

Related U.S. Application Data

(60) Provisional application No. 60/354,969, filed on Feb. 11, 2002.

(51) Int. Cl.
*G06Q 30/00* (2006.01)

(52) U.S. Cl. ............................ 705/44; 705/38; 705/39; 705/41; 705/42; 705/43

(58) Field of Classification Search ............. 705/41–44, 705/38, 39
See application file for complete search history.

(56) References Cited

U.S. PATENT DOCUMENTS

| | | | |
|---|---|---|---|
| 5,500,513 A * | 3/1996 | Langhans et al. | 235/380 |
| 5,621,201 A * | 4/1997 | Langhans et al. | 235/380 |
| 5,914,472 A | 6/1999 | Foladare et al. | 235/380 |
| 5,991,750 A * | 11/1999 | Watson | 705/44 |
| 6,018,717 A * | 1/2000 | Lee et al. | 705/13 |
| 6,226,624 B1 * | 5/2001 | Watson et al. | 705/44 |

(Continued)

FOREIGN PATENT DOCUMENTS

CA        2340621 A1      5/1999

(Continued)

OTHER PUBLICATIONS

University of Washington, "Corporate VISA Travel Accounts", Faculty and Staff Travel Guide, dated Nov. 2, 2001 (Internet Archieve Wayback Machne, dated Nov. 2, 2001).*

(Continued)

*Primary Examiner*—James P Trammell
*Assistant Examiner*—Hai Tran
(74) *Attorney, Agent, or Firm*—King & Spalding (57) ABSTRACT

Controlling the authorization of financial transactions, such as credit card transactions. Financial institutions and businesses can establish accounts for employees that have an authorization process that augments the normal authorization process, where this augmented authorization process can result in approving transactions that otherwise exceed the transaction limitations established for the account. A single event authorization control (SEAC) process can be completed in response to determining that a financial services transaction undergoing a conventional authorization process qualifies for the SEAC process. To complete the process, a SEAC data record containing parameter values that most closely match the parameter values associated with the authorization request is selected and the applicable SEAC action contained in the data record, e.g., decline override, funds encumbrance, or budgetary exception, is performed. Then, a decision regarding authorization of the transaction is generated.

23 Claims, 8 Drawing Sheets

Overall SEAC Process

U.S. PATENT DOCUMENTS

| | | | |
|---|---|---|---|
| 6,254,000 | B1 | 7/2001 | Degen et al. |
| 6,282,522 | B1 | 8/2001 | Davis et al. |
| 6,678,664 | B1 * | 1/2004 | Ganesan .................... 705/39 |
| 7,140,036 | B2 * | 11/2006 | Bhagavatula et al. ........... 726/2 |
| 2002/0174030 | A1 | 11/2002 | Praisner et al. |
| 2004/0230526 | A1 | 11/2004 | Praisner |
| 2004/0230539 | A1 | 11/2004 | Praisner |

FOREIGN PATENT DOCUMENTS

| | | |
|---|---|---|
| CA | 2332955 A1 | 9/2000 |
| GB | 2345999 A | 7/2000 |
| GB | 2353390 A | 2/2001 |
| WO | WO 99/22291 A1 | 5/1999 |
| WO | WO 00/57374 A1 | 9/2000 |

OTHER PUBLICATIONS

Visa Business: A Global Guide to Best Practices for Risk Management, Sep. 1999, pp. 1-112.

University of Washington, "Corporate VISA Travel Accounts", Faculty and Staff Travel Guide, XP-002376277, Nov. 2, 2001, http://web.archive.org/web/20011102155355/http://washington.edu/admin/travel/visa/html; pp. 1-3.

Internet Archive Wayback Machine, XP-002376278, http://web.archive.org/web/*/http://www.washington.edu/admin/travel/visa.html, pp. 1.

Supplementary European Search Report, European Patent Application No. 03719299.4, Apr. 25, 2006, pp. 1-3.

* cited by examiner

Figure 1. SEAC Process Operating Environment

Figure 2. Overall SEAC Process

Figure 3. SEAC Qualification Process

Figure 4. Process for Establishing SEAC Record

Figure 5a. SEAC Matching Process

Figure 5b. SEAC Matching Process, Continued

Figure 6. SEAC Evaluation Process

Figure 7. SEAC Action Process

US 7,509,289 B2

SYSTEM AND METHOD FOR SINGLE EVENT AUTHORIZATION CONTROL OF TRANSACTIONS

STATEMENT OF RELATED PATENT APPLICATIONS

This non-provisional patent application claims priority under 35 U.S.C. § 119 to U.S. Provisional Patent Application No. 60/354,969, titled System and Method for Single Event Authorization Control of Transactions, filed Feb. 11, 2002. This provisional application is hereby fully incorporated herein by reference.

FIELD OF THE INVENTION

The present invention relates to electronic authorization of financial transactions, and specifically to a system and method for single event authorization control of the financial transactions.

BACKGROUND OF THE INVENTION

Increasingly, commercial transactions are conducted using a credit card or similar method for cashless transactions that access a line of credit extended to the purchaser. This increase in use has triggered an increase in the complexity of the process used to authorize the transactions, which has progressed to near real time authorization, and a need for contingencies that can result in a transaction being approved that otherwise would be declined.

Purchasers using cashless transactions vary from single personal consumers to businesses or corporations that establish a series of accounts to be used by employees conducting business. In either case, limitations are imposed on the accounts based on requirements from the financial institution issuing the transaction privileges and, in the case of accounts for businesses or corporations, the business or corporation itself. In a simple example, a bank will establish a credit limit for a credit card issued to an individual. In a different example, a corporation may limit the types of purchases that can be made on a specific card, for example, travel expenses (transportation, lodging, restaurants).

Cashless transactions go through an authorization process, which results in either the purchase being approved or the purchase being disapproved, or declined. Essentially, the financial institution determines if it is willing to lend the purchaser money to complete the transaction. The authorization process may be conducted by the financial institution that owns the transaction account or that institution may contract with a third party to conduct the authorization process, an authorization agent. In either case, a record for each account is maintained that specifies the privileges and limitations associated with the account, an authorization record. Generally, funds are not transferred at the time of the authorization. Instead, the account is usually settled periodically.

In the simple example above, a merchant makes an authorization request when the individual card holder makes a purchase using the credit card. The authorization request will include the purchaser's account number and the amount of the transaction. The request may also include other information, such as a merchant category code (MCC) and a merchant identifier. The authorization agent compares the purchase amount against the available line of credit for that card (the extended line of credit less any outstanding charges against that line of credit). If the amount does not exceed the available line of credit, then the purchase is approved. Otherwise, the purchase is declined. Additionally, preliminary evaluations may be conducted, such as verifying that the card is valid and has not been stolen.

The MCC is a standard industry code established by the financial transactions services industry to partition goods and services into categories. Merchants will be assigned an MCC based on their primary business. MCCs are four digit numeric designations for businesses or types of goods and services. They are used in card processing as part of existing authorization controls. Merchant terminal systems are programmed to send the appropriate MCC with the authorization request.

These MCC categories can be used to further delineate purchase privileges and limitations. In the corporate credit card example above, the charges on the account can be limited to certain MCCs that pertain to transportation businesses (airlines, rental cars, gasoline, etc.), lodging, and restaurants. During the authorization process, an authorization request for that account would be compared against the permissible MCCs. Purchases from merchants with MCCs not extended privileges for that account would be declined, even if the purchase amount is within the available credit line for the account.

To facilitate this type of approval, the authorization agent or financial institution may group MCCs together, into MCC Groups (MCCG). An MCCG refers to a class of transactions that may have the same or similar MCCs, such as airline ticket purchases or hotel expenses. The MCCs in a particular MCCG may or may not be related. The business or corporation who establishes the accounts for its employees may define their own MCCGs. For example, MCCG "Sales" may contain the MCCs for office supplies, gasoline, and Hilton hotels. The MCCs in this group are unrelated in and of themselves; their only common characteristic is that they belong to the "Sales" MCCG.

Another type of limitation is a velocity accumulation limitation. A velocity is a transaction occurrence. An account may be limited to a number of transactions. Each time a transaction occurs, the current status of the velocity counter for an account is compared to the velocity limit associated with that account. If the accumulated velocity value is less than the velocity limit, the transaction is approved (subject to other limitations) and the velocity is increased by one.

The general authorization process in the prior art allows financial institutions and businesses and corporations establishing accounts for their employees to limit the scope of purchases for an account, either by dollar amount or merchant category, or both. Purchases outside the scope of the account are declined.

The prior art has addressed the complexities of cashless transactions and the authorization process. U.S. Pat. No. 5,991,750 to Watson recites a method and system for "pre-authorizing transactions that but for specific authorization, are otherwise proscribed." U.S. Pat. No. 5,991,750, col. 3, ll. 33-34. This patent claims "authorizing said requested transaction when in conformity with both said at least one specified transaction parameter [i.e., a pre-authorization parameter] and said account transaction limitations." Id. at col. 14, ll. 27-30 (emphasis added); see also id. at col. 15, ll. 34-38.

The prior art is unable to control a single event transaction authorization so that an unusual purchase of goods or services can be approved, even if the transaction parameters exceed the authorization limitations for the account. To date, the prior art requires the transaction to be within the transaction limitations.

What is needed is a means for approving transactions that are otherwise outside the scope of the account and would be declined or in other ways would affect the ability of the purchaser to use the account, such as having an unusual purchase affect the budget allowed for routine purchases.

SUMMARY OF THE INVENTION

The present invention provides a system and method for approving transactions that are otherwise outside the scope of the account and would be declined or in other ways would affect the ability of the purchaser to use the account. The present invention is directed to a Single Event Authorization Control (SEAC) system and method that allows financial institutions to establish parameters for controlling the authorization decision for a specific account holder's purchase. The processes described herein are useful in connection with financial service cards, such as credit cards, debit cards, stored value cards, or other cashless transactions that are used to purchase goods or services using a credit/debit card processing network in which a transaction processing system is involved in authorizing (approving/declining) a transaction in response to receiving an authorization request.

A SEAC process can be completed in response to determining that a financial service transaction undergoing a conventional authorization process qualifies for the SEAC process. To complete the process, a SEAC data record containing parameter values that most closely match the parameter values associated with the authorization request is selected and the applicable SEAC action contained in the data record, e.g., decline override, funds encumbrance, or budgetary exception, is performed. Then, a decision regarding authorization of the transaction is generated.

The aspects of the present invention may be more clearly understood and appreciated from a review of the following detailed description of the disclosed embodiments and by reference to the drawings and claims.

DETAILED DESCRIPTION OF THE EXEMPLARY EMBODIMENTS

Exemplary embodiments of the present invention provide a system and method for a financial institution to control the authorization of a single transaction event and are described in detail below.

Figure 1:
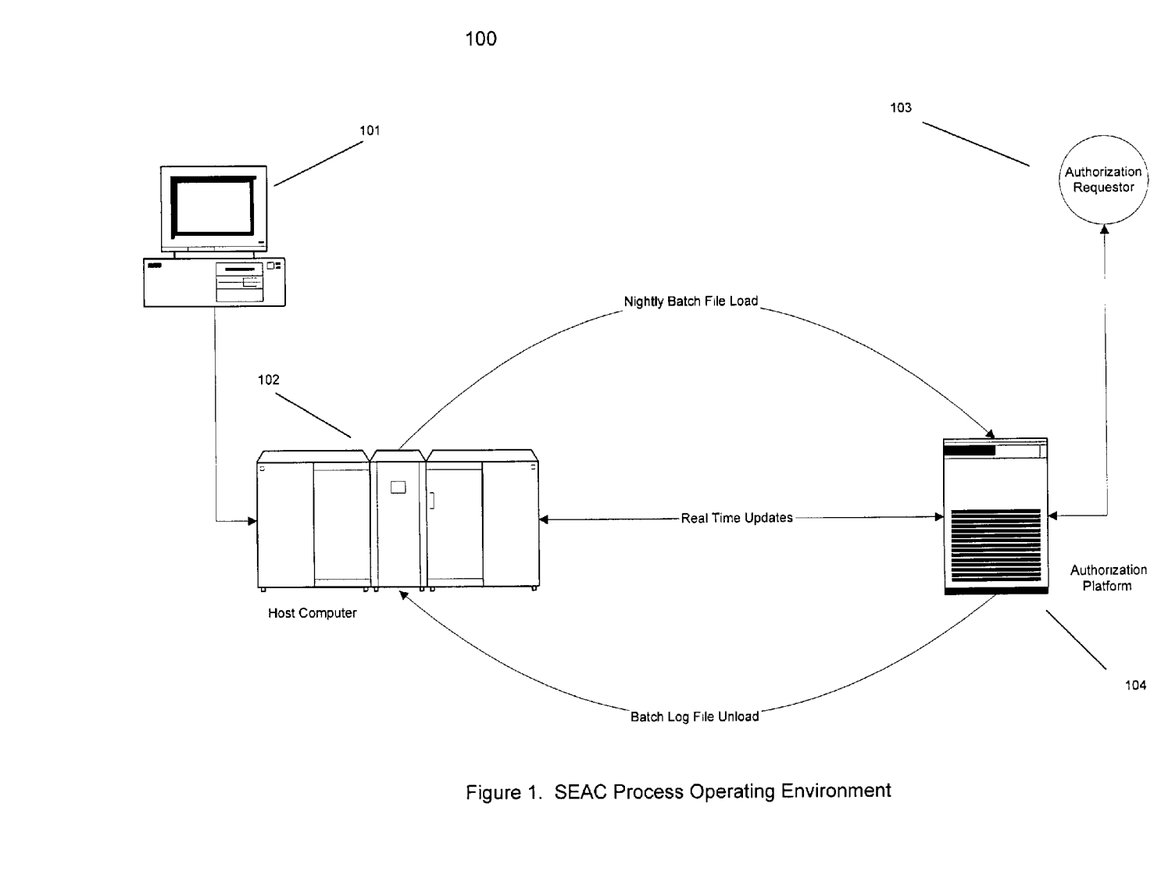
FIG. 1 presents the operating environment for an exemplary embodiment of the present invention.

FIG. 1 presents the operating environment 100 for an exemplary embodiment of the present invention. Two computer or data processing platforms are involved. The first platform is a host computer 102, for example, a mainframe, and the second platform is an authorization platform 104, which, for example, may be a minicomputer. A SEAC database, which stores information about SEAC transactions, resides on the host computer platform 102. The database is accessed through workstation 101. Authorization databases, which contain the account transaction limitations for each account, are also stored on the host computer platform 102 and loaded periodically onto the authorization platform 104.

In the exemplary embodiment of the present invention, the authorization platform 104 also maintains the SEAC database. The host computer platform 102 transmits the SEAC database to the authorization platform 104 periodically in a batch file. The authorization platform 104 performs the transaction authorization process, and as will be described below, matches incoming authorizations to the SEAC database. In addition, the logic for performing other functions, such as available funds and velocity accumulation, is performed by the authorization platform 104 in response to an authorization request from the authorization requestor 103.

In addition to periodically loading of the database from the host computer platform 102, the host computer platform 102 and the authorization platform 104 may provide real-time updates to the SEAC and authorization databases on each of the platforms. Also, the authorization platform 104 may unload a batch log file with processed transactions to the host platform 102 periodically.

Figure 2:
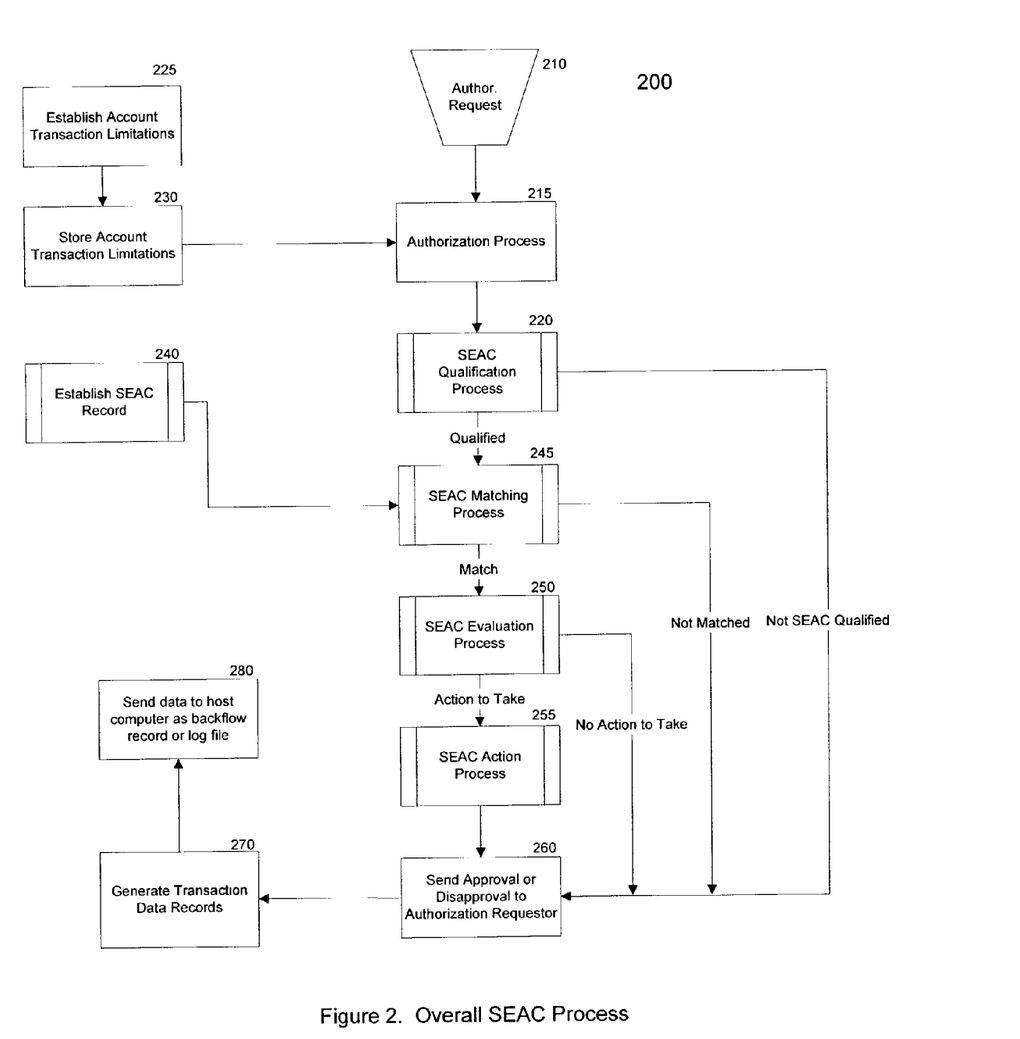
FIG. 2 presents an overview of the process steps for the exemplary embodiment of the present invention.

FIG. 2 presents the overall SEAC process 200 for an exemplary embodiment of the present invention. At step 210, an authorization request comes from the authorization requestor 103 for processing by the authorization platform 104. This step may be triggered when a card holder begins to make a purchase of a good or service. At step 215, the normal authorization process occurs at the authorization platform 104. Information, such as the account number, purchase amount, MCC, client identifier for the financial institute issuing the card, and merchant identifier are transferred with the request. In step 215, the transaction amount and MCC are compared to the account transaction limitations in the authorization database record for the account involved in the current transaction, also referred to herein as the account limitations record. These limits may be contained in from one to nine separate records, each record comprising an MCCG. During this comparison process, the MCCG record that corresponds to the MCC for the transaction is identified. Prior to the transaction, the financial institution established account transaction limitations for one to as many as nine MCCGs at step 225. These limitation may have been established in conjunction with limitations imposed by a business or corporation who originated the account for one of its employees for business transactions. The account transaction limitations are stored in the host computer 102 and authorization platform 104 at step 230 for accessing during the authorization process 215.

Step 215 results in an approval/disapproval (or decline) decision. After that decision logic is complete, the process moves to step 220 to consider whether the transaction qualifies for SEAC processing, which could result in an approval decision despite the decision reached at step 215. Step 220 is discussed in greater detail below in connection with FIG. 3. If the transaction qualifies for SEAC processing, it moves to step 245. If not, the process moves to step 260 and the decision made at step 215 is sent by the authorization platform 104 to the authorization requestor 103.

At step 245, values for the specific transaction parameters, which may include account number, purchase amount, MCC, date, client identifier, and merchant identifier, are matched with values for these parameters contained in a SEAC data record. In this step, the SEAC data records associated with the account number that were previously generated at step 240 are searched by the authorization platform 104. Multiple SEAC data records may exist for each account number. Step 245 is discussed in greater detail below in connection with FIGS. 5a and 5b.

If the transaction parameter values do not match any of the SEAC data records for the account involved in the current transaction, the process moves to step 260 and the decision made at step 215 is sent by the authorization platform 104 to the authorization requester 103. If the values match a SEAC data record, the process moves to step 250. At step 250, the process determines which, if any, SEAC actions are to be performed on this transaction. If SEAC actions can be performed on the transaction, the process moves to step 255. If not, the process moves to step 260 and the decision made at step 215 is sent to the authorization requester 103. Step 250 is discussed in greater detail below in connection with FIG. 6.

At step 255, the applicable SEAC action is conducted. In this exemplary embodiment of the present invention, the actions may include decline override, budgetary exception, or fund encumbrance. These actions, as well as step 255 are described in detail below in connection with FIG. 7.

Following the action, the resulting decision is send by the authorization platform 104 to the authorization requestor 103 at step 260. Additionally, transaction data records are generated by the authorization platform 104 at step 270 associated with the transaction, regardless of whether the transaction survived the entire SEAC process. In the exemplary embodiment of the present invention, these data records are sent to the host computer 102 by the authorization platform 104 at step 280, once at the end of the transaction process as a backflow record then again as part of a batch log file on a periodic basis.

Figure 3:
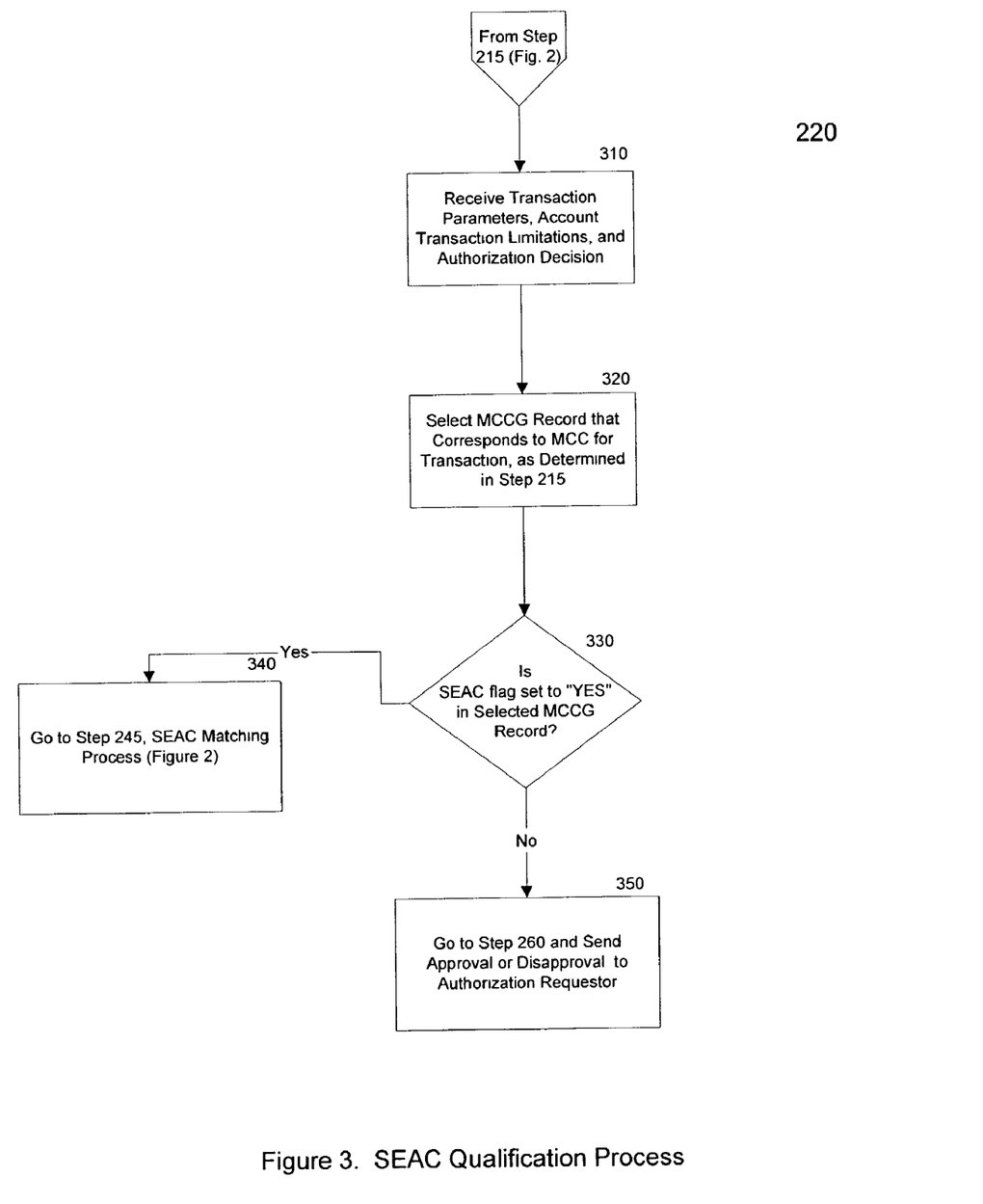
FIG. 3 presents details for the qualification process for the exemplary embodiment of the present invention.

FIG. 3 presents details on the SEAC Qualification step 220 for the exemplary embodiment of the present invention. At step 310, the transaction parameter values, account transaction limitation record for the MCCG corresponding to the MCC for the transaction, and authorization decision are received from the authorization process step 215. At step 320, the MCCG record corresponding to the MCC for the transaction is selected from the data transferred from step 215. At step 330, the process determines if a SEAC flag is set to "Yes" in the selected MCCG record. The SEAC flag is a data field within the record that establishes whether transactions within the MCCG covered by the record should undergo the SEAC process. If the "Yes" flag is present, the process moves to step 340, which takes the process to the SEAC matching step, step 245. If the "Yes" flag is not present, the process moves to step 350 and the authorization platform 104 sends the approval or disapproval to the authorization requester 103, as decided at step 215, through step 260. One skilled in the art would appreciate that any type of data flag can be used to indicate that the transaction qualifies for the SEAC process.

Figure 4:
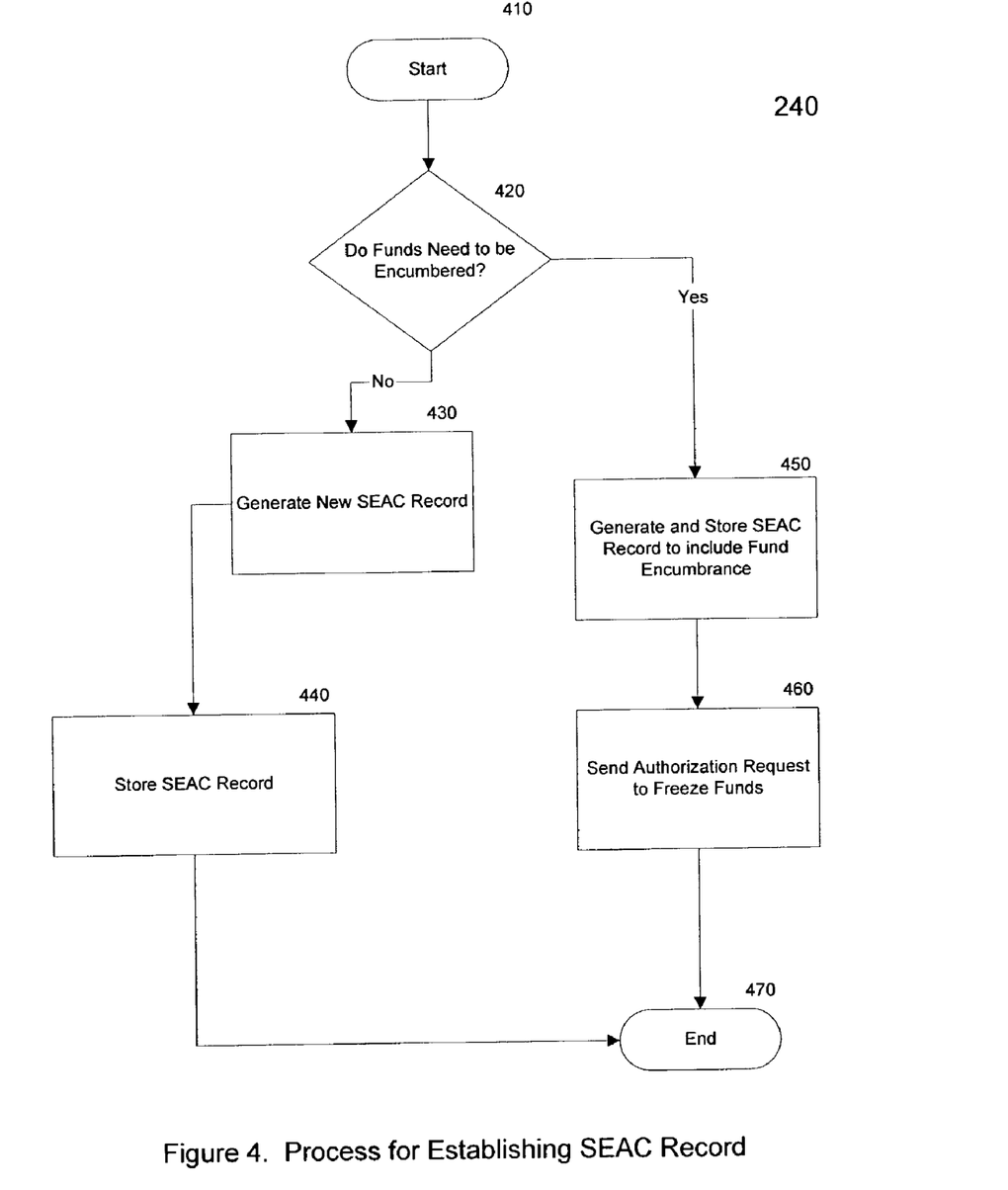
FIG. 4 presents details for establishing a Single Event Authorization Control record for the exemplary embodiment of the present invention.

FIG. 4 depicts the process for establishing a SEAC data record 240 for the exemplary embodiment of the present invention. The SEAC data record provides input to the SEAC matching step 245. The process is initiated at step 410. At step 420, the process decides whether the SEAC data record is being established as part of a fund encumbrance. Funds Encumbrance is a feature that allows the system to draw down an account's available money when a SEAC data record is created and then tie the reserved funds to the purchase when the authorization associated with a later transaction for which the finds were encumbered is made.

If the SEAC data record is not being generated as part of a funds encumbrance, the record is generated at step 430. This record is stored in the SEAC database in step 440, which is maintained on the host computer 102 and authorization platform 104. Table 1 presents a SEAC data record for the exemplary embodiment of the present invention.

TABLE 1

SEAC data record Layout

| Field Name | Note |
|---|---|
| Client ID | Card processor number assigned to a card issuer |
| Account number | Credit Card number |
| Sequence Number | Card processor internal field |
| SEAC Amount | Max value: $999,999,999,999.99 |
| Max Amount | Max value: $999,999,999,999.99 |
| Min Amount | Min value: $0.01 |
| MCC | Merchant category code |
| Budgetary Exception | Y/N flag |
| Funds Encumbrance | Y/N flag |
| Begin Effective Date | YYYMMDD format |
| End Effective Date | YYYMMDD format |
| User Data | Data that is used to identify or match to a particular card user (PIN, voice imprint, etc.) |
| Vendor Information | Vendor identifier |
| Decline Override Type | 0808 (exceed MCCG SPL), 0806 (exceed preferred vendor SPL), 0817 (exceed MCCG Vel #), 0818 (exceed MCCG vel $), 0803 (MCCG exclude). These values represent authorization decline reasons (that a SEAC data record may override) |

With reference to Table 1, a SEAC data record may contain several fields, including, for example, fields for Client Identifier (an identifier assigned by the credit card processor to each card issuer), Account Number, Sequence Number (unique value comprised of creation date/sequence number or absolute time/sequence number), SEAC Amount, Maximum Authorization Amount, Minimum Authorization Amount, MCCG, Vendor Information, Begin Effective Date, End Effective Date, Decline Override Type reason(s) specifying the authorization decline reason that a SEAC data record may override, Budgetary Exception flag, Funds Encumbrance flag, and User Data.

MCCs are four digit numeric designations for businesses or types of goods and services. They are used in card processing as part of existing authorization controls. Merchant terminal systems are programmed to send the appropriate MCC with the authorization request. An MCCG refers to a class of transactions that may have the same or similar MCCs, such as airline ticket purchases or hotel expenses. The MCCs in a particular MCCG may or may not be related. Users of the authorization system may define their own MCCG.

Budgetary Exception is a feature that allows the system to bypass velocity accruals for incoming authorizations that are matched to a SEAC data record flagged as a budgetary exception. Only authorizations with a final approved status are eligible for Budgetary Exception processing. The authorization platform 104 bypasses velocity accumulation for authorizations that match a Budgetary Exception SEAC flag.

Funds Encumbrance is a feature that allows the system to draw down accounts available money when a SEAC data record is created and then tie the reserved funds to a specific future purchase.

Decline Override is a feature that involves the capability to approve an authorization that was declined for a decline type contained in the matched the SEAC data record. All decline reasons present in the incoming authorization must be overridden for approval. However, a SEAC data record may contain more decline reasons than the matched and overridden authorization decision. A maximum number of decline types, for example five (5) in this exemplary embodiment, are allowed on a SEAC data record. One skilled in the art would appreciate that any number of decline types could be used in the SEAC process. Because the authorization platform 104 responds with only one velocity decline reason even though an authorization may be declined at multiple velocity instances (daily, weekly, quarterly, cycle, other, etc.), the decline override for velocities will override any and all velocity related declines. The assumption is that an account should only be set up with one type of velocity constraint for predictable results.

Vendor Information is a feature that allows the system to embed vendor information in the SEAC data record for use in the matching process.

User Data matching is a feature that involves accepting user data coming in with or as part of an incoming authorization request for use in the matching algorithm against the SEAC database. The source of the user data can be a keyboard, keypad, voice microphone, etc., and the user data may be a personal identification number (PIN) or other user identification alphanumeric data, a spoken password, or a voice profile/imprint. The user data are passed from an outside source to the authorization platform 104 in a private label environment.

Returning to FIG. 4, if the SEAC data record was being established for funds encumbrance, i.e., the yes branch of step 420, the process moves to step 450 and the fund encumbrance data item in the SEAC data record is set to "Y." (see Table 1) and the generated SEAC data record is stored in the SEAC database. The process then moves to step 460 and sends an authorization request to freeze funds. This step is internal to the authorization platform 104. One aspect of the authorization/SEAC process sends an authorization request to another aspect of the process, in a similar fashion as a request comes into the authorization platform 104 from an external authorization requestor 103. A SEAC data record that encumbers funds does not accrue into velocities. The SEAC database associated with the host computer platform 102 will be used by batch processing to adjust available funds for accounts using funds encumbrance. Real time log messages are sent from the authorization platform 104 to update the SEAC database associated with the host computer platform 102 for funds encumbrance usage. The process ends at step 470.

Figure 5A:
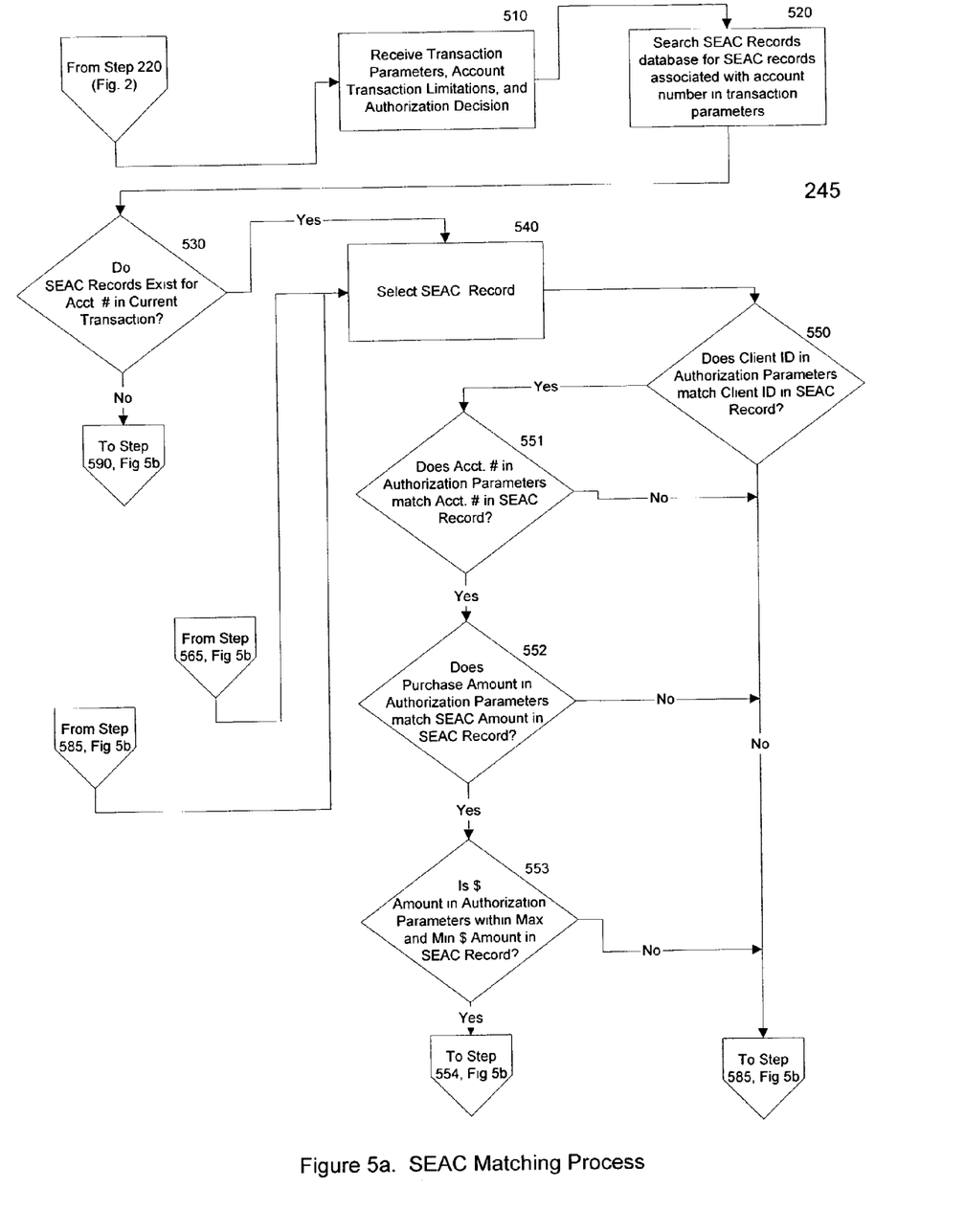
FIGS. 5*a* and 5*b* present details for the matching process for the exemplary embodiment of the present invention.
Figure 5B:
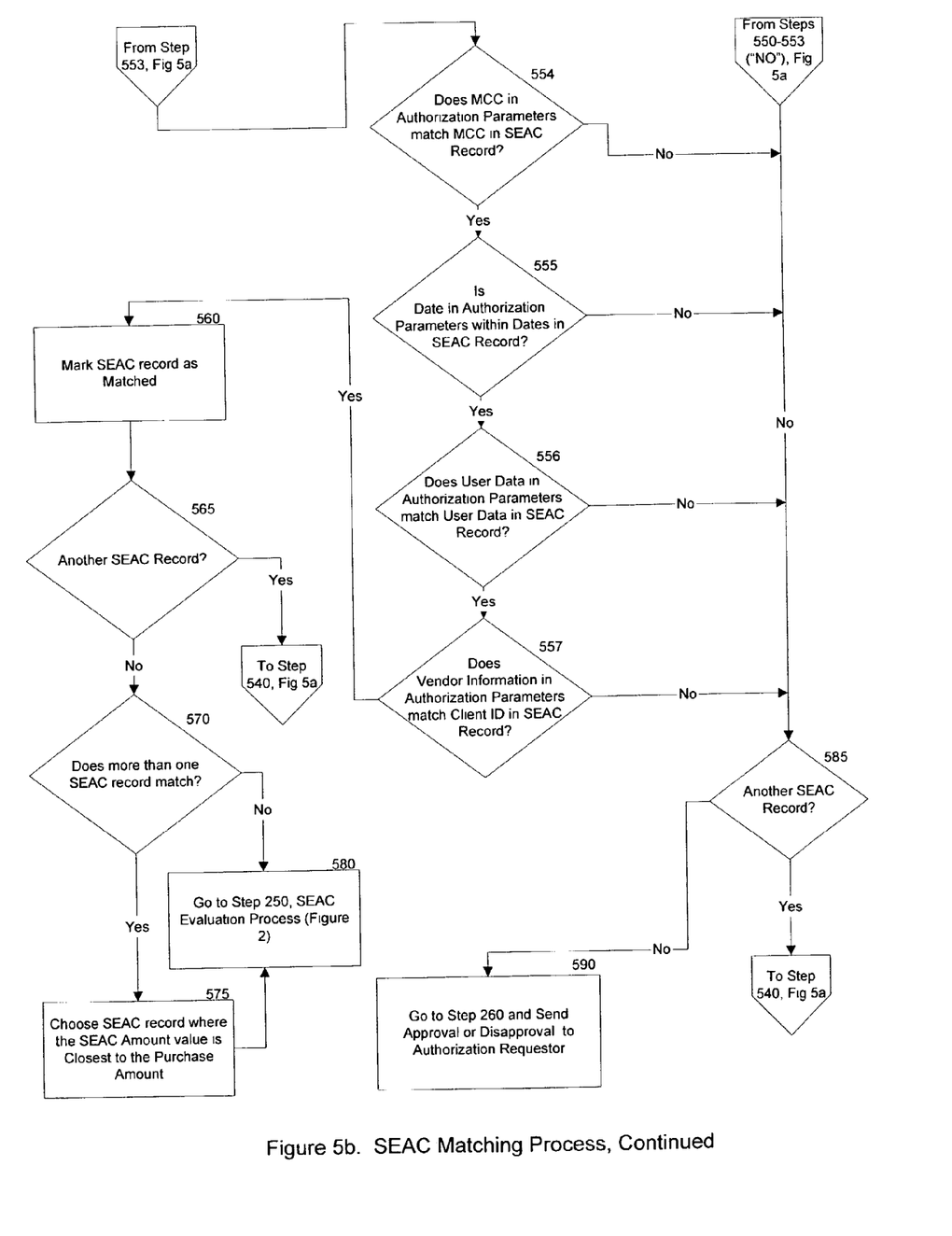

FIG. 5 presents the SEAC matching process 245 for the exemplary embodiment of the present invention. At step 510, the process receives transaction parameters, account transaction limitations, and the authorization decision made at step 215 from step 220. At step 520, the SEAC database is searched by the authorization platform 104 for SEAC data records associated with the account number for the transaction under consideration. At step 530, the process decides if any SEAC data records exist for the account number. If not, at step 580, the process moves to step 260 and the authorization platform 104 sends the approval or disapproval decision to the authorization requestor.

If the decision at step 530 is "Yes," then one of the SEAC data records found in the SEAC database is selected at step 540. Then, a series of matching inquiries occurs at steps 551, 552, 553, 554, 555, 556, and 557. These steps determine if the values for account number, dollar amount, MCC, date, client identifier, user data, and vendor information on the SEAC data record match the value in the transaction parameters for the transaction of interest. The inquiries are in series, so the result of each inquiry must be "Yes" for a SEAC match to be found. If the result for all inquires is "Yes," the process moves to step 560, which marks the record as matched and moves to step 565. In step 565, the process determines if additional SEAC data records exist for the account number. If "Yes," the process returns to step 540 and repeats as outlined above. If "No," the process determines if more than one SEAC data record matched the authorization parameters at step 570. If 'Yes," the process moves to step 575 and selects the record with the purchase amount closest to the SEAC amount in the SEAC data record. If the result of step 570 is "No" and after step 575, the process moves to step 580, which takes the process to SEAC evaluation, step 250.

If the result of any of the inquiries is "No," the process moves to step 585, which makes a determination whether additional SEAC data records for the account number exist. If they exist, the process returns to step 540 and repeats as outlined above. If no other SEAC data records exist, the process moves to step 590 and the authorization platform 104 sends the approval or disapproval decision to the authorization requestor 103 through step 260.

The seven inquiries discussed above comprise the exemplary embodiment for the present invention. One skilled in the art would appreciate that additional data can be stored on the SEAC data record and involved in the SEAC matching. Alternatively, some of the data on the SEAC data record could be missing from the authorization parameters sent by the authorization requester. In that case, an alternative embodiment could be designed to ignore those parameters or exit the SEAC process if the parameters are missing. In still another alternative, one data field, such as the User Data field, could be used exclusively to match a SEAC transaction.

Figure 6:
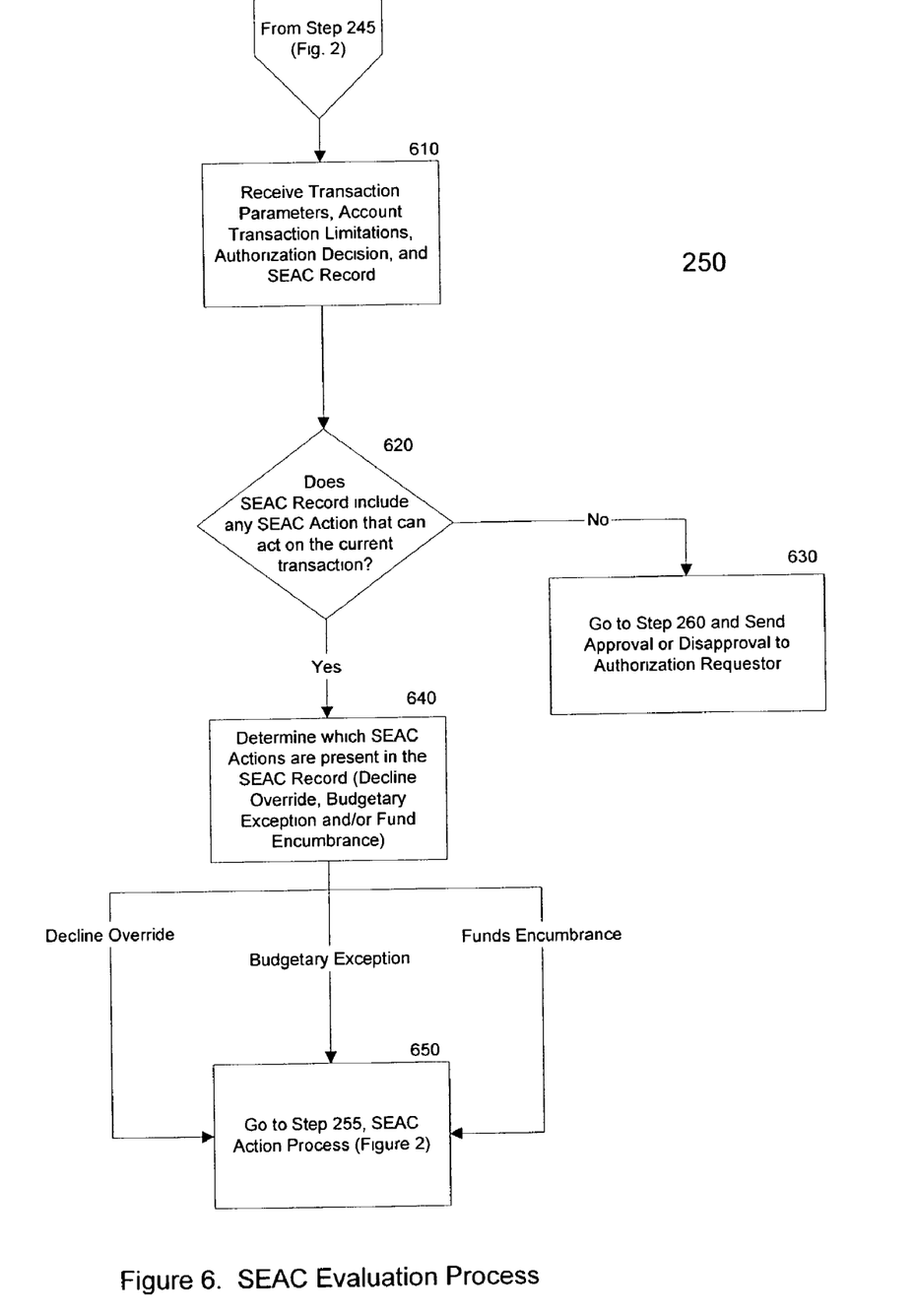
FIG. 6 presents details for the evaluation process for the exemplary embodiment of the present invention.

FIG. 6 presents the SEAC evaluation process 250 for the exemplary embodiment of the present invention. At step 610, the process receives transaction parameters, account transaction limitations, the authorization decision made at step 215 from step 220, and the matched SEAC data record from step 245. At step 620, a determination is made as to whether the SEAC actions listed on the SEAC data record can be applied to the transaction. If none of the actions included on the matched record can be applied to the transaction, the process moves to step 630 and the authorization platform 104 sends the approval or disapproval decision to the authorization requestor 103 through step 260. An example of this result would be a transaction that was declined for exceeding the velocity number for the MCCG covering the transaction, yet the SEAC data record includes a decline override for exceeding the amount limitation only. The record could survive the SEAC process to this point, but the action associated with the SEAC data record could not be applied to the transaction of interest.

If the SEAC data record does include a SEAC action that can be applied to the current transaction, the process moves to step 640. At step 640, the process identifies which SEAC actions are present in the record and can be applied to the current transaction. At step 650, the process moves to step 255 and the authorization platform 104 executes the SEAC actions.

Figure 7:
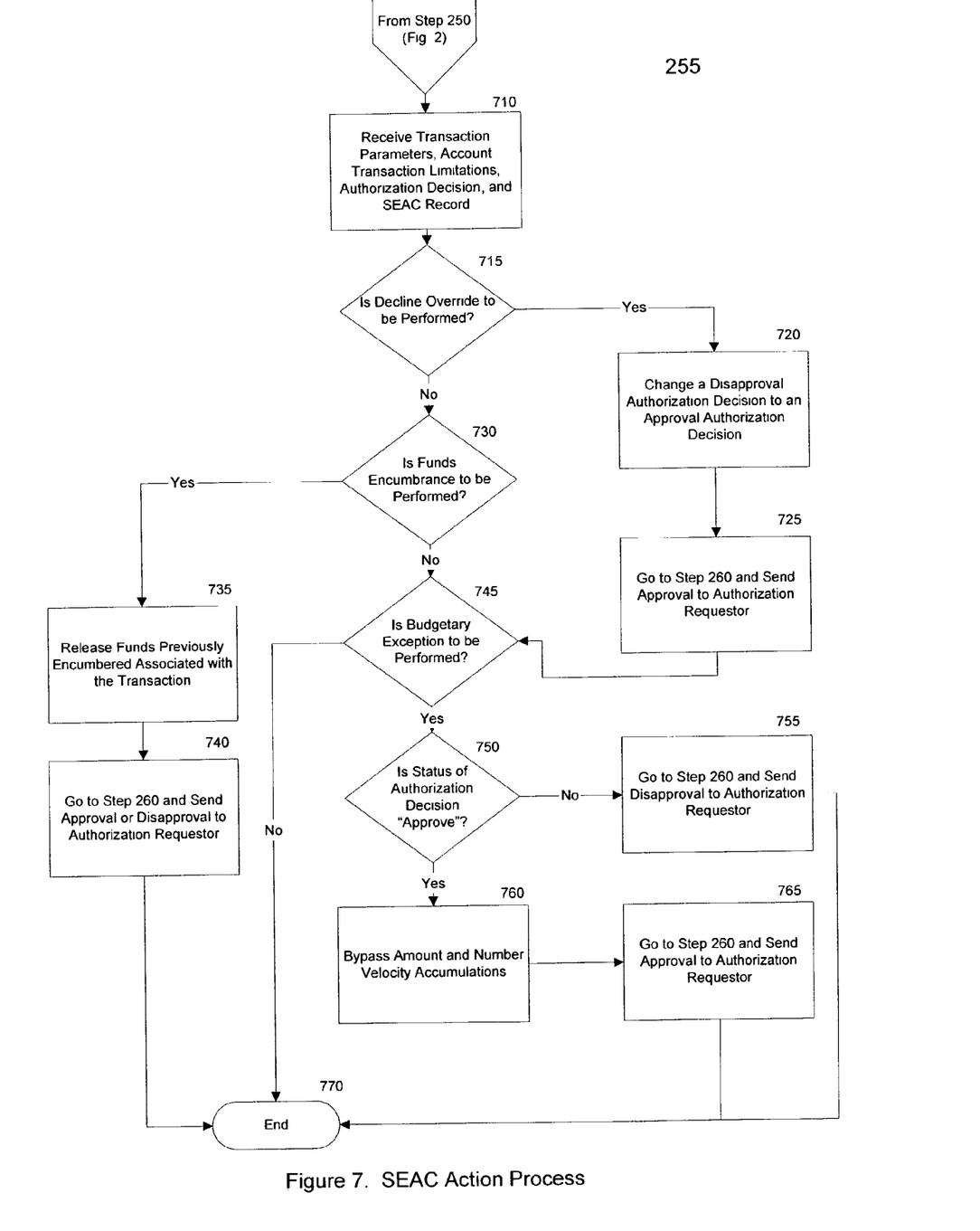
FIG. 7 presents details for the action process for the exemplary embodiment of the present invention.

FIG. 7 presents the SEAC action process 255 for the exemplary embodiment of the present invention. In step 710, the process receives transaction parameters, account transaction limitations, the authorization decision made at step 215 from step 220, and the matched SEAC data record from step 245. At step 715, a determination is made as to whether the decline override action is to be taken. If so, the process moves to step 720, where a disapproval authorization decision is changed to an approval authorization decision. At step 725, the authorization process 104 sends the approval authorization decision to the authorization requestor 103 through step 260. The process then moves to step 745, which is discussed below.

If the result of the decision at step 715 is "No," the process moves to step 730, where a determination is made as to whether the fund encumbrance action is to be performed. If "Yes," the process moves to step 735, where the funds encumbered during the SEAC data record generation process (see FIG. 4) are released. The process then moves to step 740 and sends the approval authorization decision to the authorization requestor 103 through step 260, who will re-encumber the actual purchase amount against the available credit limit as part of the normal transaction process. The process then ends at step 770.

If the result of step 730 is "No," the process moves to step 745 and determines whether a budgetary exception action is to be applied. If "No," the process ends at step 770. If "Yes," the process moves to step 750 and determines if the current status of the authorization decision, either based on the result of step 215 or step 720, is an approval. If "No," the process goes to step 755 and sends the disapproval authorization decision to the authorization requester through step 260. If "Yes," the process goes to step 760 and bypasses the velocity accumulations against the available line of credit and number of transactions. The process goes to step 765 and the authorization platform 104 sends the approval authorization decision to the authorization requester 103 through step 260. The process ends at step 770.

Table 2 presents a matrix for most of the decision scenarios for the exemplary embodiment of the present invention.

In scenarios 1 and 6, the transaction does not qualify for SEAC processing. The original approve/disapprove decision becomes the final decision. Similarly, in scenarios 2 and 7, the transaction qualifies for SEAC processing, but the SEAC data record parameter values do not match the transaction parameter values sent by the authorization requestor. The original approve/disapprove decision becomes the final decision.

In scenario 3, a transaction with an "approval" authorization decision qualifies for the SEAC process and matches the SEAC data record. However, no Budgetary Exception or Funds Encumbrance action is to be performed so no action is needed, since a decline override action is not needed to change a disapproval to an approval decision. In comparison, for scenario 4, the budgetary exception action applies to the transaction and the velocity accumulations are bypassed before the approval decision is sent.

Scenario 5 covers a funds encumbrance action for a SEAC qualified and matched transaction. Funds are released and the approval decision is sent to the authorization requestor. In scenario 12, also a funds encumbrance action for a SEAC qualified and matched transaction, the funds are also released. As for the authorization decision, the disapproval decision is sent to the authorization requester unless the reason for the disapproval was an insufficient credit limit because the credit limit reflected the encumbered funds. In that case, the disapproval is changed to an approval if adding the encumbered funds to the credit limit results in sufficient funds.

In scenario 8, a SEAC qualified and matched transaction has a disapproval that is not overridden. This scenario illus-

TABLE 2

Exemplary Embodiment Decision Scenarios

| Scenario # | Approve/ Disapprove | Qualify | Match | Evaluate | Action | Response |
|---|---|---|---|---|---|---|
| 1 | Approve | No | NA | NA | NA | Approve |
| 2 | Approve | Yes | No | NA | NA | Approve |
| 3 | Approve | Yes | Yes | Budgetary Exception? No Fund Encumbrance? No | NA | Approve |
| 4 | Approve | Yes | Yes | Budgetary Exception? Yes Fund Encumbrance? No | Bypass velocity accumulation | Approve |
| 5 | Approve | Yes | Yes | Fund Encumbrance | Release funds | Approve |
| 6 | Disapprove | No | NA | NA | NA | Disapprove |
| 7 | Disapprove | Yes | No | NA | NA | Disapprove |
| 8 | Disapprove | Yes | Yes | Declines overridden? No | NA | Disapprove |
| 9 | Disapprove | Yes | Yes | Declines overridden? Yes Budgetary Exception? No | Change disapproval to approve | Approve |
| 10 | Disapprove | Yes | Yes | Declines overridden? No Budgetary Exception? Yes | NA | Disapprove |
| 11 | Disapprove | Yes | Yes | Declines overridden Yes Budgetary Exception? Yes | Change disapproval to approve Bypass velocity accumulation | Approve |
| 12 | Disapprove | Yes | Yes | Fund Encumbrance | Release Funds | Disapprove/ Approve* |

*Response is "Approve" if the transaction was declined because the fund encumbrance caused a "disapproval" because the credit limit would be exceeded.

trates the case where a decline override exists for the record, but not for the reason that resulted in the original disapproval. The original disapproval decision is sent to the authorization requestor.

In scenario 9, a SEAC qualified and matched transaction has an original disapproval decision. A decline override applies to the reason for the original disapproval decision and the action is taken to change the disapproval to an approval.

In scenarios 10 and 11, budgetary exception applies to a SEAC qualified and matched transaction that was originally disapproved. In scenario 10, the disapproval is not overridden, so no action is taken. Budgetary exceptions apply only to approved transactions. In comparison, in scenario 11, the disapproval is first changed to an approval, since decline override action applies to the transaction, then the velocity accumulations are bypassed for the transaction.

As can be seen from the discussion above, the SEAC process is flexible enough to result in approval decisions even when the transaction limitation parameters are exceeded for the transaction.

In view of the foregoing, one would appreciate that the present invention supports processing an authorization request associated with a financial service transaction. A determination is made whether an incoming authorization request for the transaction qualifies for SEAC processing. A SEAC data record associated with the authorization request is selected based on the closest match of transaction parameters of an authorization data record. Each SEAC data record typically comprises a client identifier field, an account number field, a SEAC amount field, a maximum amount field, a minimum amount field, a merchant category code field, a budgetary exception flag, a funds encumbrance flag, and a decline override type field. An authorization response is generated by performing all SEAC actions in the selected SEAC data record. These actions allow approval of the financial services transaction even when the transaction parameters exceed the transaction limitations for the account involved in the transaction. One would also appreciate a system comprising two computer platforms for maintaining financial transaction authorization databases and a SEAC database and including an authorization platform for implementing normal and SEAC processing methods.

We claim:

1. A method for processing an authorization request associated with a financial service transaction, comprising the steps of:
   completing a conventional authorization process for the financial service transaction by processing an authorization data record comprising transaction parameters in response to receiving the authorization request; and
   completing a single event authorization control (SEAC) process for the authorization for the financial service transaction in response to determining that the authorization request is qualified for the SEAC process, wherein the SEAC process comprises the steps:
      selecting one of a plurality of SEAC data records associated with the authorization request that most closely matches the transaction parameters of the authorization data record, each SEAC data record comprising at least one SEAC action comprising one of decline override, budgetary exception, and funds encumbrance;
      completing each SEAC action for the selected SEAC data record that can be taken for the authorization request; and
      generating by a computer a decision regarding authorization for the financial service transaction in response to completing each SEAC action for the selected SEAC data record.

2. The method of claim 1, wherein each authorization data record comprises at least an account number, a monetary amount, and one of a plurality of merchant codes.

3. The method in claim 1 where the step of determining that the authorization request is qualified for the SEAC process comprises the steps of:
   selecting the authorization data record for a merchant category code group corresponding to a merchant category code for the financial service transaction; and
   identifying whether the authorization data record comprises the identifier specifying the SEAC authorization process authorization data record.

4. The method in claim 1 further comprising the step of establishing the SEAC data record by completing the steps of:
   determining if funds need to be encumbered;
   if funds do need to be encumbered, generating one of the SEAC data records where a SEAC action for funds encumbrance is contained;
   sending an authorization request to an authorization platform to encumber funds; and
   if funds do not need to be encumbered, generating one of the SEAC data records comprising at least an account number, at least one of a plurality of merchant codes, and at least one SEAC action.

5. The method in claim 1 where the SEAC data record comprises a client identifier field, an account number field, a SEAC amount field, a maximum amount field, a minimum amount field, a merchant category code field, a budgetary exception flag, a funds encumbrance flag, and a decline override type field.

6. The method in claim 1 where the step of selecting one of a plurality of SEAC data record that most closely matches the transaction parameters comprises the steps of:
   (a) searching a SEAC records database for SEAC records associated with an account number associated in the authorization data record;
   (b) selecting one of the SEAC records that is associated with the account number;
   (c) determining if the parameter values contained in the selected SEAC record match values of the transaction parameters in the authorization data record;
   (d) repeating steps (b)-(c) for all SEAC records associated with the account number; and
   (e) determining which of the SEAC data records that matched values of the transaction parameters in step (c) has a transaction amount closest to the transaction amount in the authorization data record.

7. A method for processing an authorization request associated with a financial service transaction, comprising the steps of:
   completing a conventional authorization process for the financial service transaction by processing an authorization data record in response to receiving the authorization request; and
   in response to recognizing that the financial service transaction further qualifies for a single event authorization control (SEAC) process, completing at least one SEAC action comprising one of decline override, budgetary exception, and funds encumbrance and generating by a computer a decision regarding authorization for the financial service transaction based on each completed SEAC action.

8. The method in claim 7 where the step of recognizing that the financial service transaction further qualifies for a SEAC authorization comprises the steps of:

selecting the authorization data record for a merchant category code group corresponding to a merchant category code for the financial service transaction; and identifying whether the authorization data record comprises an identifier specifying the SEAC authorization for the authorization data record.

9. The method in claim 7 wherein the SEAC process comprises the steps of:

selecting one of a plurality of SEAC data records associated with the authorization request that most closely matches the transaction parameters of the authorization data record, each SEAC data record comprising at least one SEAC action comprising one of decline override, budgetary exception, and funds encumbrance;

completing each SEAC action for the selected SEAC data record that can be taken for the authorization request; and generating the decision regarding authorization for the financial service transaction in response to completing each SEAC action for the selected SEAC data record.

10. A computer implemented method for processing an authorization request associated with a financial service transaction, comprising the steps of:

completing a conventional authorization process for the financial service transaction by processing an authorization data record generating an initial authorization decision in response to receiving the authorization request; and in response to recognizing that the financial service transaction further qualifies for authorization exception handling, completing at least one single event authorization control (SEAC) action comprising one of decline override, budgetary exception, and funds encumbrance and generating by a computer a decision regarding authorization for the financial service transaction by applying each completed SEAC action to the initial authorization decision.

11. The method in claim 10 where the step of recognizing that the financial service transaction further qualifies for authorization exception handling comprises the steps of:

selecting the authorization data record for a merchant category code group corresponding to a merchant category code for the financial service transaction; and identifying whether the authorization data record comprises an identifier specifying the SEAC authorization for the authorization data record.

12. The method in claim 10 wherein authorization exception handling comprises the steps of:

selecting one of a plurality of SEAC data records associated with the authorization request that most closely matches the transaction parameters of the authorization data record, each SEAC data record comprising at least one SEAC action comprising one of decline override, budgetary exception, and funds encumbrance;

completing each SEAC action for the selected SEAC data record that can be taken for the authorization request; and generating the decision regarding authorization for the financial service transaction in response to applying each SEAC action to the initial authorization decision.

13. A method for processing an authorization request associated with a financial service transaction, comprising the steps of:

following a conventional authorization process for the financial service transaction, receiving an authorization data record comprising a plurality of transaction parameters associated with the authorization request;

determining if the authorization request is qualified for processing by a single event action control (SEAC) authorization process by identifying whether the authorization data record comprises an identifier specifying the SEAC authorization process;

if the authorization request is qualified to proceed through the SEAC authorization process, receiving at least one SEAC data record comprising at least one SEAC action based on the authorization data record associated with the authorization request, wherein the SEAC action comprising one of decline override, budgetary exception, and funds encumbrance;

selecting the SEAC data record that matches the transaction parameters and evaluating whether any SEAC action in the selected SEAC data record can be taken for the authorization request; and if so, then generating by a computer an authorization response for the financial service transaction by performing all SEAC actions in the selected SEAC data record that can be taken for the authorization request.

14. The method of claim 13, wherein each authorization data record comprises at least an account number, a monetary amount, and one of a plurality of merchant codes.

15. The method in claim 13 where the step of determining if the authorization request is qualified for processing by the SEAC authorization process comprises the steps of:

selecting the authorization data record for a merchant category code group corresponding to a merchant category code for the financial service transaction; and identifying whether the authorization data record comprises an identifier specifying the SEAC authorization process authorization data record.

16. The method in claim 13 further comprising the step of establishing the SEAC data record by completing the steps of:

determining if funds need to be encumbered;

if funds do need to be encumbered, generating one of the SEAC data records where a SEAC action for funds encumbrance is contained;

sending an authorization request to the authorization platform to encumber funds; and if funds do not need to be encumbered, generating one of the SEAC data records comprising at least an account number, at least one of a plurality of merchant category codes, and at least one SEAC action.

17. The method in claim 13 where the SEAC data record comprises a client identifier field, an account number field, a SEAC amount field, a maximum amount field, a minimum amount field, a merchant category code field, a budgetary exception flag, a funds encumbrance flag, and a decline override type field.

18. The method in claim 13 where the step of selecting the SEAC data record that most closely matches the transaction parameters comprises the steps of:

(a) searching a SEAC records database for SEAC records associated with an account number associated in the authorization data record;

(b) selecting one of the SEAC records that is associated with the account number;

(c) determining if the parameter values contained in the selected SEAC record match values of the transaction parameters in the authorization data record;
(d) repeating steps (b)-(c) for all SEAC records determined to be associated with the account number; and
(e) determining which of the SEAC data records that matched values of the transaction parameters in step (c) has a transaction amount closest to the transaction amount in the authorization data record.

19. The method of claim 13 where the step of evaluating whether any SEAC action in the matched selected SEAC data record can be taken for the authorization request comprises the steps of:
determining if the matched selected SEAC record includes any SEAC action that can act on the transaction; and
determining which of a plurality of SEAC actions are present in the SEAC record.

20. The method of claim 13, where the SEAC actions comprise decline override, budgetary exception, and funds encumbrance.

21. The method of claim 20, where the step of generating an authorization response by performing all SEAC actions in the selected SEAC data record that can be taken for the authorization request comprises the steps of:
determining if decline override is to be performed;
if decline override is to be performed, changing a disapproval authorization decision to an approval authorization decision;
determining if funds encumbrance is to be performed;
if funds encumbrance is to be performed, releasing funds previously encumbered;
determining if budgetary exception is to be performed;
if budgetary exception is to be performed, determining if the status of the authorization decision is approve; and
if the status of the authorization decision is approve, bypassing the amount and number velocity accumulations.

22. A system for processing an authorization request associated with a financial service transaction, comprising:
a host computer, operable to maintain a plurality of databases comprising financial service transaction authorization data; and
the authorization platform, coupled to the host computer and a telecommunications system, operable to receive the authorization request over the telecommunications system and to accept a loading of the databases from the host computer,
the authorization platform operative to generate an initial authorization decision by completing a conventional transaction authorization based on the financial service transaction authorization data in response to receiving the authorization request,
the authorization platform further operative to perform a single event action control (SEAC) authorization in the event that the authorization request qualifies for SEAC authorization handling by completing at least one SEAC action comprising one of decline override, budgetary exception, and funds encumbrance based on the financial service transaction authorization data and generating a decision regarding authorization for the financial service transaction by applying each completed SEAC action to the initial authorization decision.

23. The system of claim 22 where the plurality of databases comprise a SEAC records database and an authorization database.

* * * * *